US007975160B2

(12) United States Patent
Smith et al.

(10) Patent No.: US 7,975,160 B2
(45) Date of Patent: Jul. 5, 2011

(54) SYSTEM AND METHOD FOR PRECISE ABSOLUTE TIME EVENT GENERATION AND CAPTURE

(75) Inventors: Jeremy D. Smith, Salt Lake City, UT (US); Jason R. Thomas, Salt Lake City, UT (US); Stan B. Thomas, Salt Lake City, UT (US); Lawrence R. Wiencke, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 933 days.

(21) Appl. No.: 11/823,841

(22) Filed: Jun. 28, 2007

(65) Prior Publication Data

US 2008/0016384 A1 Jan. 17, 2008

Related U.S. Application Data

(60) Provisional application No. 60/806,047, filed on Jun. 28, 2006.

(51) Int. Cl.
*G06F 1/00* (2006.01)
*G06F 1/14* (2006.01)

(52) U.S. Cl. ........................................ 713/500; 713/502

(58) Field of Classification Search .................. 713/500, 713/502
See application file for complete search history.

(56) References Cited

U.S. PATENT DOCUMENTS 5,548,562 A * 8/1996 Helgerud et al. ............... 367/14
5,689,689 A 11/1997 Meyers et al.
6,209,090 B1 3/2001 Aisenberg et al.
6,226,762 B1 * 5/2001 Foote et al. ..................... 714/48
6,433,734 B1 8/2002 Krasner
6,778,136 B2 8/2004 Gronemeyer
6,903,681 B2 6/2005 Faris et al.
7,109,475 B1 * 9/2006 Hardman et al. ............. 250/287
2002/0069076 A1 6/2002 Faris et al.
2005/0062643 A1 * 3/2005 Pande et al. ................ 342/357.1
2006/0109107 A1 * 5/2006 Staton et al. ............. 340/539.13
2006/0209941 A1 9/2006 Kroeger

OTHER PUBLICATIONS

Berns et al., "GPS Time Synchronization in School-Network Cosmic Ray Detectors", Nov. 14, 2003.*

(Continued)

*Primary Examiner* — Mark Connolly
(74) *Attorney, Agent, or Firm* — Thorpe North & Western LLP

(57) ABSTRACT

The present invention is a system and method for precise absolute time event generation and capture. One embodiment of the present invention is a programmable hardware module for TTL pulse generation and capture in absolute time. The nominal accuracy of the programmable hardware module is 25 ns. The time reference is an on-board GPS (Global Positioning System) receiver. The hardware embodiment of the present invention can generate eight independently programmable outputs and capture the times on eight independently programmable inputs. An exemplary application for the present invention is triggering external light sources, and flash-lamp pumped lasers in particular, at specific times for calibration of cosmic-ray observatories. A software embodiment of the present invention is implemented in a Linux software device driver interface featuring an extensive set of user commands.

10 Claims, 8 Drawing Sheets

OTHER PUBLICATIONS

F. Arqueros, et al. "The Central Laser Facility at the Pierre Auger Observatory", 29$^{th}$ International Cosmic Ray Conference Pune (2005) 8, 335-338.

M. Chikawa, et al. "Atmospheric Monitoring with LIDAR method for the TA Experiment", 29$^{th}$ International Cosmic Ray Conference Pune (2005) 8, 137-140.

J. H. Boyer, et al. "FADC-based DAQ for HiRes Fly's Eye", Nuclear Instruments and Methods in Physics Research A 482 (2002) 457-474.

J. Abraham, et al. "Properties and performance of the prototype instrument for the Pierre Auger Observatory", Nuclear Instruments and Methods in Physics Research A 523 (2004) 50-95.

R. Abbasi, et al. "Techniques for measuring atmospheric aerosols at the high resolution fly's eye experiment", Astroparticle Physics 25 (2006) 74-83.

* cited by examiner

SYSTEM AND METHOD FOR PRECISE ABSOLUTE TIME EVENT GENERATION AND CAPTURE

CROSS-REFERENCE TO RELATED APPLICATIONS

This nonprovisional patent application claims benefit and priority under 35 U.S.C. §119(e) of the filing of U.S. Provisional Patent Application Ser. No. 60/806,047 filed Jun. 28, 2006, titled: "SYSTEM AND METHOD FOR PRECISE ABSOLUTE TIME EVENT GENERATION AND CAPTURE", the contents of which are incorporated herein by reference for all purposes.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for in the terms of grants PHY-9322298, 9974537, 9904048, 0140688 awarded by the National Science Foundation (NSF).

BACKGROUND OF THE INVENTION

1. Field of the Invention

The invention relates generally to devices for generating and capturing electronic timing events and for capturing software timing events. More specifically, the invention is a system and method for precise absolute time event generation and capture.

2. State of the Art

Many devices use local clocks to provide internal time synchronization between subsystems that are connected electrically. Computers, for example, may have a master clock used by other electronic devices to synchronize various operations, such as data transfers, within the computer. Typically, all of the electronic devices in the computer have an electrical connection to the master clock.

Time synchronization between instruments that cannot be connected by timing cables is a requirement common to many applications. A related requirement is time synchronization to an absolute global time standard.

Thus, it would be desirable to have a flexible system and method configured for wirelessly generating and capturing precise timing events. It would be advantageous if such a system could operate over global distances. It would be further advantageous to have a system capable of synchronizing to an absolute clock standard, such as the global positioning system (GPS) clock.

SUMMARY OF THE INVENTION

An embodiment of a system for precise absolute time event generation and capture is disclosed. The system may include a timing event generator for generating output timing events, wherein the output timing events may be a rising edge, a falling edge or any combination of a rising or falling edge. The system may further include a timing event receiver for sensing input timing events, wherein the input timing events may be a rising edge, a falling edge or any combination of a rising edge or falling edge. The system may further include a universal clock receiver for obtaining an absolute time clock signal and a processor in communication with the timing event generator, the timing event receiver and the universal clock receiver.

An embodiment of a method for capturing absolute timing events is disclosed. The method may include tracking absolute time. The method may further include capturing timing events. The method may further include time stamping the captured timing events relative to the absolute time and measuring elapsed time between the time stamped events.

An embodiment of a method for generating electronic timing events is disclosed. The method may include tracking absolute time. The method may further include defining a timing pulse sequence. The method may further include calibrating the defined timing pulse sequence to the absolute time and outputting the absolute time calibrated timing pulse sequence.

An embodiment of a system for precise absolute time event generation and capture is disclosed. The system may include an input device, an output device, a memory device and an absolute time event generator and capture circuit. The system may further include a processor in communication with the input device, the output device, the memory device and the absolute time event generator and capture circuit.

An embodiment of a system for precise absolute time event generation and capture is disclosed. The system may include a circuit card. The circuit card may include an oscillator, a global positioning system (GPS) engine for receiving a GPS clock, a plurality of timing event inputs, a plurality of timing event outputs, a host bus interface and time event generation and capture logic in communication with the oscillator, the GPS engine, the plurality of timing event inputs and outputs and the host bus interface. The system may further include a software device driver configured for controlling the circuit card through the host bus interface and time-stamping the plurality of timing event inputs and outputs with absolute time based on the GPS clock.

An embodiment of a system for calibrating cosmic ray detectors is disclosed. The system may include a plurality of lasers and a timing event generator in communication with the plurality of lasers, the timing event generator configured for generating a plurality of precisely timed digital trigger pulses to fire the plurality of lasers.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION OF THE INVENTION

A system and method for precise absolute time event generation and capture is disclosed. A system embodiment of the present invention, including a programmable hardware module and the software device driver is also disclosed. The systems and methods disclosed herein have broad application and may be used virtually anywhere that requires precise digital timing events registered to an absolute time clock. Exemplary embodiments of the system and method of the present invention are disclosed herein. However, it will be understood that the exemplary embodiments are intended to merely illustrate the potential scope of the invention and are not intended to be limiting of the scope of the present invention.

Figure 1:
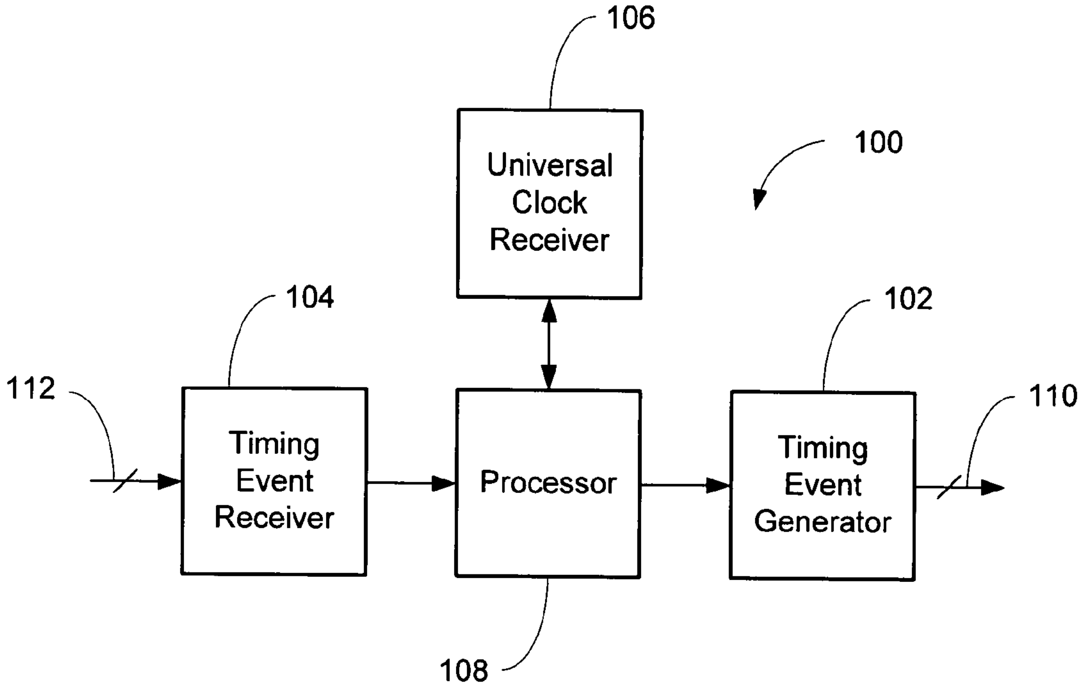
FIG. 1 is a block diagram of an embodiment of a system for precise absolute time event generation and capture, according to the present invention.

FIG. 1 is a block diagram of an embodiment of a system 100 for precise absolute time event generation and capture, according to the present invention. System 100 may include a timing event generator 102 for generating output timing events, wherein the output timing events may be a rising edge, a falling edge or any combination of a rising or falling edge. System 100 may further include a timing event receiver 104 for sensing input timing events, wherein the input timing events may be a rising edge, a falling edge or any combination of a rising edge or falling edge. System 100 may further include a universal clock receiver 106 for obtaining an absolute time clock signal. System 100 may further include a processor 108 in communication with the timing event generator 102, the timing event receiver 104 and the universal clock receiver 106.

According to another embodiment of system 100, the timing event generator 102 may include pulse edge logic (not shown in FIG. 1, but see 520 in FIG. 5 and related discussion below) configured for generating the output timing events synchronized to the absolute time clock signal. According to another embodiment of system 100, the timing event receiver 104 may include capture edge logic (not shown in FIG. 1, but see 518 in FIG. 5 and related discussion below) for receiving timing events synchronized to the absolute time clock.

According to another embodiment of system 100, the timing event generator 102 may be configured to independently generate the output timing events on a plurality of output channels 110 (arrow with slash through it). It will be understood that any number of output channels 110 may be employed depending on the application. For example, according to one embodiment of system 100, the timing event generator 102 may be configured for generating the output timing events on eight output channels 110.

According to another embodiment of system 100, the timing event receiver 104 may be configured to independently receive input timing events on a plurality of input channels 112 (arrow with slash through it). It will be understood that any number of input channels 112 may be employed depending on the application. For example, according to one embodiment of system 100, the timing event receiver 104 may be configured for receiving the input timing events on eight input channels 112.

Accuracy of timing events generated and captured by system 100 and measurements relative to such timing events may be limited by various parameters including, for example, internal clock speeds, logic delays, loading, etc. According to one embodiment of system 100, the timing event generation and capture comprises a timing measurement error of about 25 ns or less. According to another embodiment of system 100, the timing event generation and capture comprises a timing measurement error of about 12.5 ns or less. It will be understood that these nominal accuracies are exemplary and not to be considered limiting of the present invention.

According to another embodiment of system 100, the universal clock receiver 106 may be configured to provide a GPS timing signal. According to yet another embodiment of system 100, the universal clock receiver 106 comprises a GPS engine.

Figure 2:
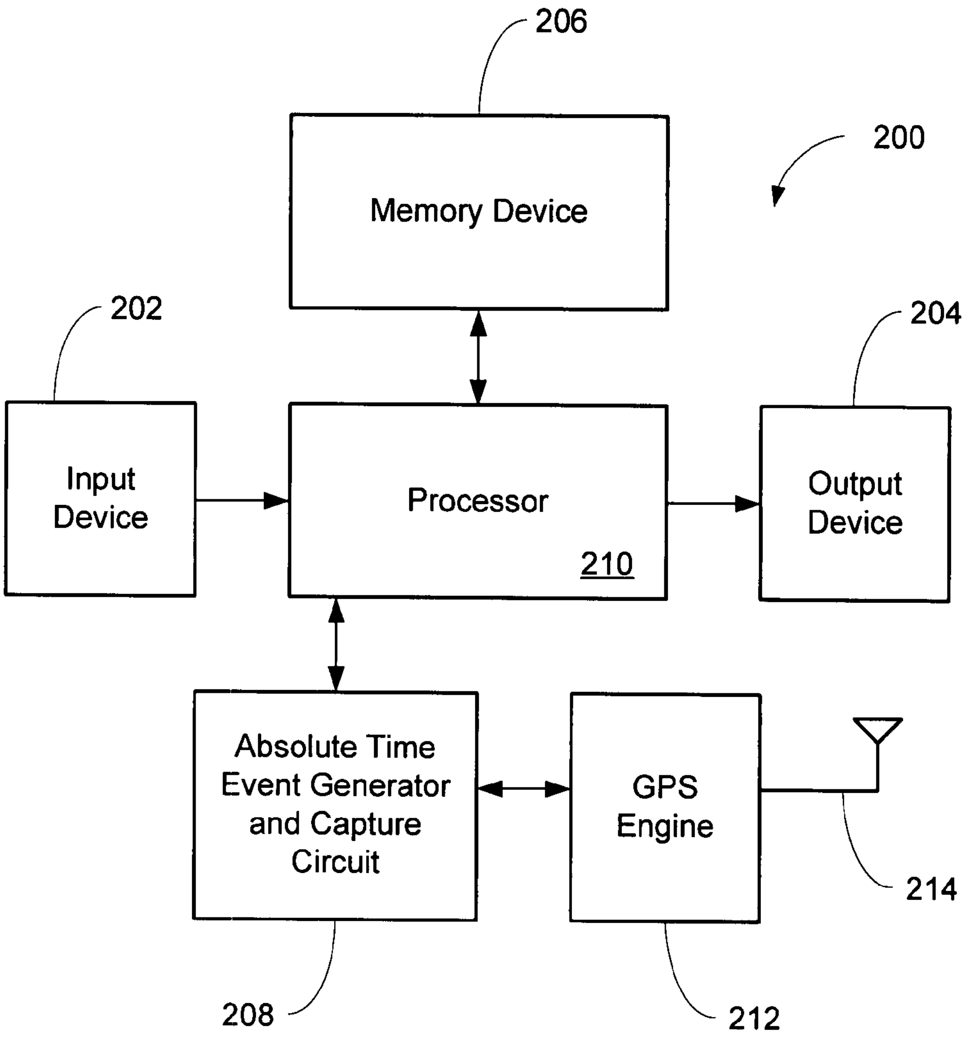
FIG. 2 is a block diagram of another embodiment of a system for precise absolute time event generation and capture, according to the present invention.

FIG. 2 is a block diagram of another embodiment of a system 200 for precise absolute time event generation and capture, according to the present invention. System 200 may include an input device 202. Input device 202 may be, for example and not by way of limitation, a keyboard or any other user interface to system 200. System 200 may further include an output device 204. Output device may be, for example and not by way of limitation, a computer monitor, printer or other computer output device. System 200 may further include a memory device 206. Memory device 206 may be, for example and not by way of limitation, solid state computer memory, magnetic memory such as a hard disk, a floppy disk, tape storage, magneto-optic drive, or optical memory, such as compact disk read only memory (CD-ROM), digital versatile disk read only memory (DVD-ROM) or any other suitable computer media and format for storing computer data and computer program instructions.

System 200 may further include an absolute time event generator and capture circuit 208. System 200 may further include a processor 210 in communication with the input device 202, the output device 204, the memory device 206 and the absolute time event generator and capture circuit 208. System 200 may further include a GPS engine 212 in communication with the absolute time event generator and capture circuit 208. The GPS engine 212 may be configured to provide system 200 with an absolute time signal. The GPS engine 212 may include an integral or attached antenna 214 for receiving GPS signals and in particular a GPS timing signal.

According to an embodiment of system 200, the memory device 206 may include computer-readable instructions for implementing a method for capturing absolute timing events. The method for capturing absolute timing events stored in memory device 206 may be method 300 as described below. According to another embodiment of system 200, the memory device 206 may include computer-readable instructions for implementing a method for generating electronic timing events. The method for generating absolute timing events stored in memory device 206 may be method 400 as described below.

Figure 3:
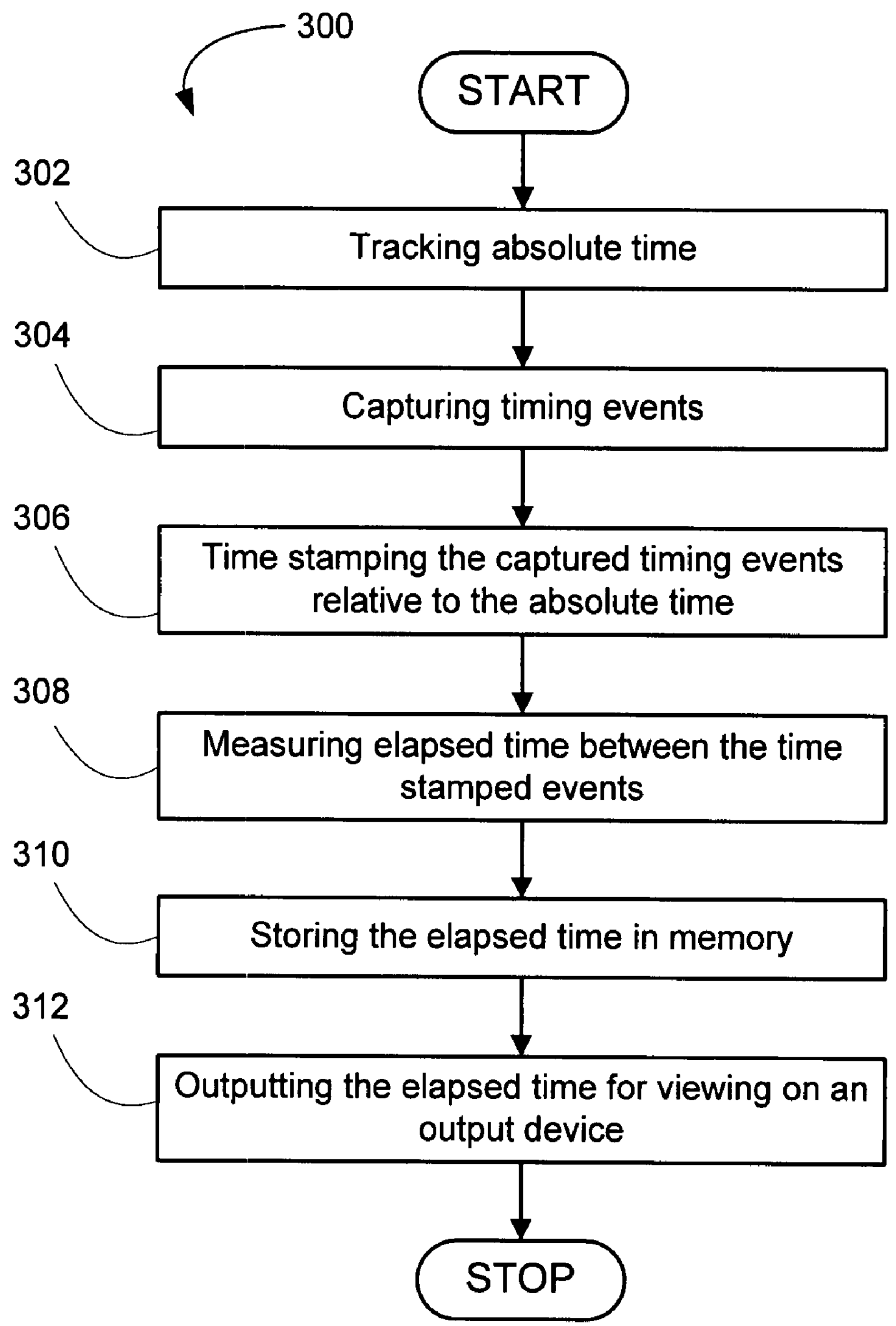
FIG. 3 is a flow chart of an embodiment of a method for capturing absolute timing events according to the present invention.

FIG. 3 is a flow chart of an embodiment of a method 300 for capturing absolute timing events according to the present invention. Method 300 may include tracking 302 absolute time. Absolute time may be a universal clock signal according to one embodiment of method 300. According to another embodiment, absolute time may be a GPS time signal. Method 300 may further include capturing 304 timing events. Timing events may be any of the following: a rising edge, a falling edge or a pulse in a digital signal. Method 300 may further include time stamping 306 the captured timing events relative to the absolute time. Method 300 may further include measuring 308 elapsed time between the time stamped events. According to another embodiment, method 300 may further include storing 310 the elapsed time in memory. According to yet another embodiment, method 300 may further include outputting 312 the elapsed time for viewing on an output device. It will be understood that the elapsed time may be output 312 for viewing without storing 310 in memory or stored 310 in memory without outputting 312 for viewing. According to yet another embodiment of method 300, tracking 302 absolute time may include receiving a GPS time signal.

Figure 4:
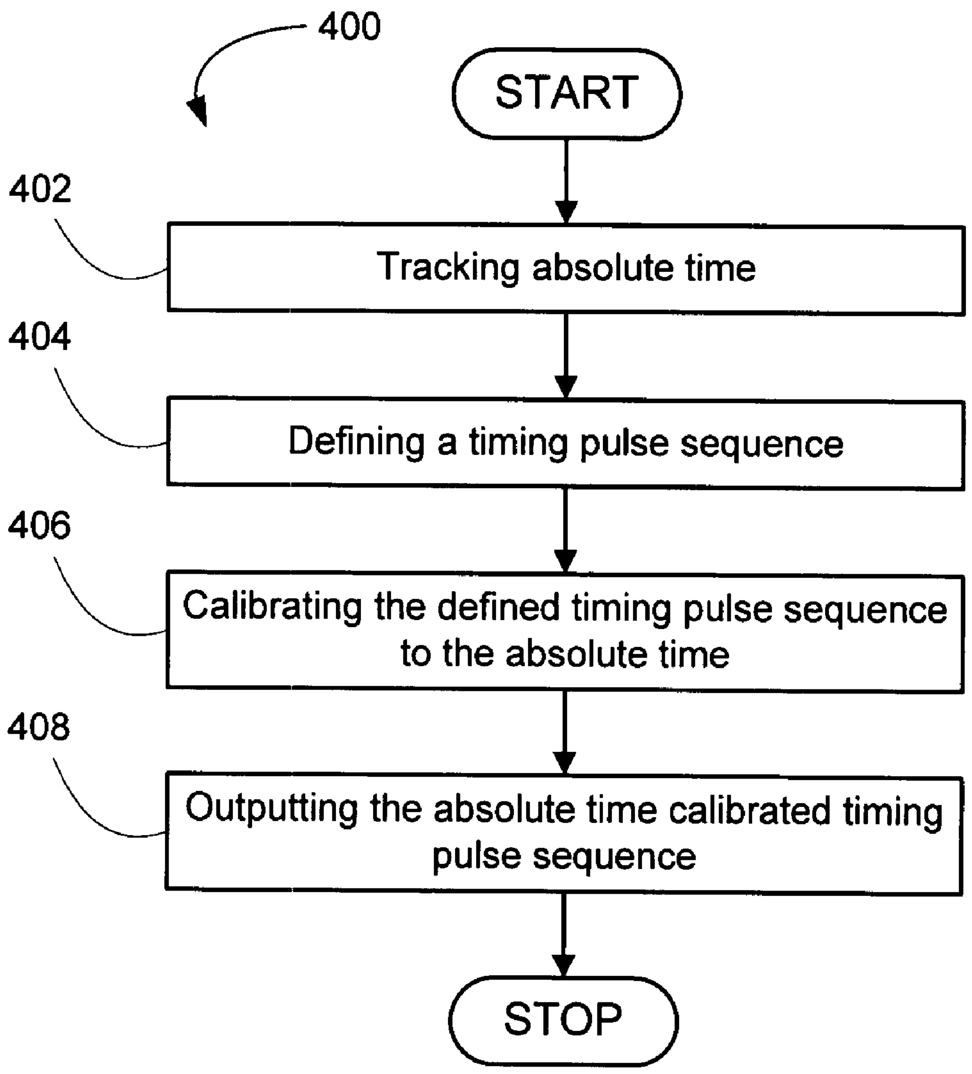
FIG. 4 is a flow chart of an embodiment of a method for generating electronic timing events, according to the present invention.

FIG. 4 is a flow chart of an embodiment of a method 400 for generating electronic timing events, according to the present invention. Method 400 may include tracking 402 absolute time. According to one embodiment of method 400, tracking 402 absolute time may include receiving a GPS time signal. Method 400 may further include defining 404 a timing pulse sequence. According to one embodiment of method 400, defining 404 a timing pulse sequence may include defining an arbitrary sequence of rising and falling edges separated by preselected time periods. Method 400 may further include calibrating 406 the defined timing pulse sequence to the absolute time. According to one embodiment of method 400, calibrating 406 the defined timing pulse sequence to the absolute time may include synchronizing the arbitrary combination of rising and falling edges according to points in absolute time. Method 400 may further include outputting 408 the absolute time calibrated timing pulse sequence.

Figure 5:
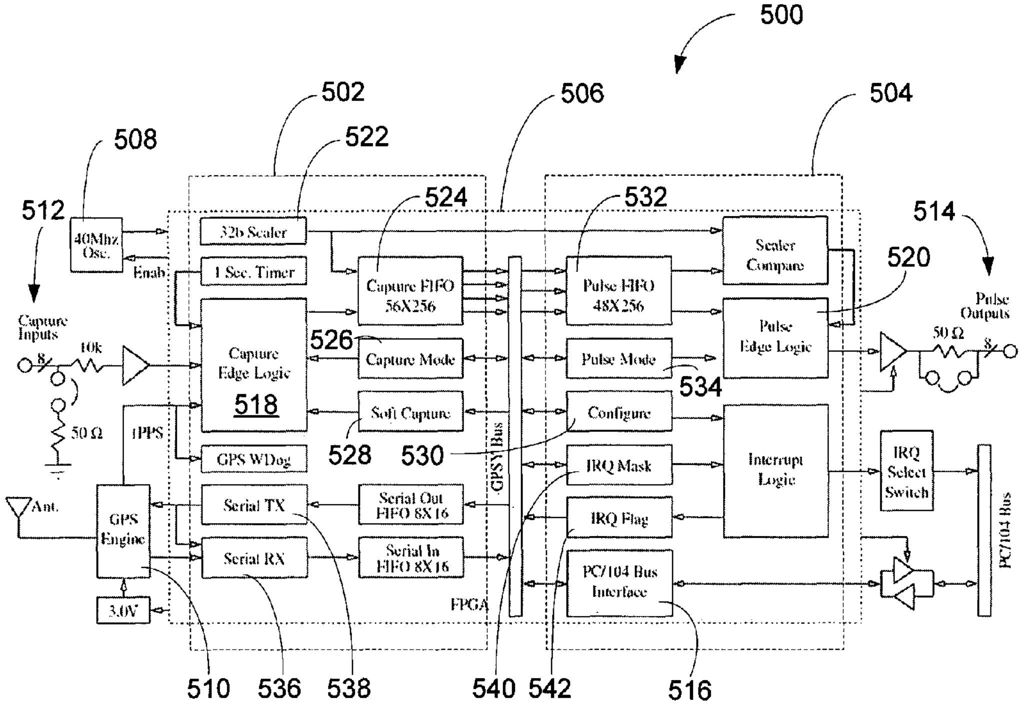
FIG. 5 is a block diagram of an embodiment of a system for precise absolute time event generation and capture, according to the present invention.

FIG. 5 is a block diagram of an embodiment of a system (shown generally at 500) for precise absolute time event generation and capture, according to the present invention. System 500 may include timing event capture circuitry 502 and timing event generation circuitry 504 implemented in a single integrated circuit 506. Timing event capture circuitry 502 may include capture edge logic 518 for capturing the input timing events received from timing event inputs 512. Timing event generation circuitry 504 may include pulse edge logic 520 for generating output timing events driven at timing event outputs 514. Integrated circuit 506 may be a field programmable gate array (FPGA) as illustrated in FIG. 5. It will be understood that integrated circuit 506 may alternatively be implemented in an application specific integrated circuit (ASIC) or any other suitable digital integrated circuit technology, including a combination of distinct ICs.

Referring again to FIG. 5, system 500 may include an oscillator 508, a GPS engine 510 for receiving a GPS clock, a plurality of timing event inputs (shown generally at 512), a plurality of timing event outputs (shown generally at 514), a host bus interface 516 in communication with timing event capture circuitry 502 and timing event generation circuitry 504. System 500 may further include a software device driver configured for controlling system 500 through the host bus interface 516 and time-stamping the plurality of timing event inputs 512 and outputs 514 with absolute time, based on the GPS clock.

A circuit card embodiment of system 500 may be a programmable hardware module for transistor-transistor logic (TTL) pulse generation and capture in absolute time. The nominal accuracy of the programmable hardware module is 25 ns. The global or absolute time reference may be, for example and not by way of limitation, an on-board GPS receiver. This particular programmable hardware module embodiment may be configured to generate eight independently programmable timing event outputs and capture timing events on eight independently programmable inputs. This particular hardware embodiment described herein is configured for a standard PC104 layout for use with embedded computer systems.

Referring again to FIG. 5, system 500 can capture (timestamp) the rising, falling or both edges of eight separate 5-volt TTL logic inputs with 25 ns resolution. System 500 can also generate pulse-edge sequences on eight separate outputs with the same 25 ns resolution. The absolute times of the captured and generated pulse edges are continuously calibrated against GPS engine 510. GPS engine 510 may be a Motorola™ M12+ Timing Global-Positioning-System (GPS) receiver. Of course, one skilled in the art will readily recognize that any suitable precision clock such as an atomic time standard or some other GPS engine may be used consistent with the principles of the present invention. For example and not by way of limitation, GPS engine 510 may be an M12M receiver from I-Lotus™ or the CW12 receiver from Navsynch™. The specified 1-sigma accuracy of the Motorola™ M12+ Timing Global-Positioning-System (GPS) receiver is about 5 ns. System 500 does not include an on-board micro-controller. Instead, the circuit card embodiment of system 500 relies on a PC/104 host processor and a software device driver for full functionality. It will be understood that any suitable processor and host bus interface may be employed to implement a system 500 according to the present invention. Those of ordinary skill in the art, given this disclosure, will be able to implement such embodiments without undue experimentation.

Referring again to FIG. 5, a 32-bit scaler 522 clocked with a 40 MHz oscillator 508 provides timing for system 500. For selected input events, this scaler 522 is latched into a 256 entry first-in-first-out (FIFO) capture buffer 524. A 24-bit status word that records the triggering events and the current logic levels of all triggering and non-triggering channels is also captured. The triggering capture events may be any of the following: rising, falling or both edges of any of the eight capture inputs, the GPS receiver's calibrated one-second pulse output, a uncalibrated one-second timer, "soft" captures by the host processor writing one of thirty-one "signature" values to the soft-capture register 528 on the module. The device driver (see 800, FIG. 8) on the host processor recognizes the captured GPS receiver's one-second pulse and computes a continuous calibration of the free-running scaler frequency. The capture-mode register 526 controls which pulse edges for each external input generate a capture. The configuration register 530 enables GPS and uncalibrated one-second captures. The uncalibrated (but accurate to better than 50 ppm) one-second capture may be used in situations where relative but not absolute timing is required and the GPS receiver is not available.

To generate pulse-edge sequences, the device driver software on the host processor uses the captured GPS one-second events to compute a list of free-running scaler values for each output pulse rising and falling edge. This list, along with 16-bit control words that define the required rising/falling edge action for each of the eight outputs, is written to a "256" entry pulse FIFO 532. When the free-running scaler matches the FIFO output scaler value, the action defined by the associated control-word is performed by the pulse-edge logic 520 and the next FIFO entry is read. The pulse-mode register 534 allows enabling or disabling any specific action on each output. If a pulse-edge sequence has already been loaded into the pulse-output FIFO 532, the output can still be enabled or disabled to an "off" state without truncating pulses by specifically enabling or disabling either rising or falling edges for the selected output.

The Motorola™ M12+ Timing GPS receiver (GPS engine 510) uses an RS-232 serial port for configuration and status messages. System 500 translates these serial input and output streams via a universal asynchronous receiver/transmitter (UART) to a simple byte stream that the host processor can access through I/O registers. The UART is buffered by 16 byte FIFOs for both the receiver and transmitter.

The capture input FIFO 524, the pulse output FIFO 532, and the GPS serial receive 536 and GPS serial transmit 538 FIFOs are all interrupt driven. The host processor does not need to poll the FIFO status to find out when a FIFO is ready for reading or writing. Four other "error" interrupts may also be generated: (1) watch-dog timeouts on the GPS one-second pulse, (2) over-run errors on the pulse-edge capture, (3) over-run errors on the GPS serial receive FIFOs and (4) framing errors on the GPS serial input. All of these interrupts can be individually enabled with the interrupt-mask register 540 and monitored with the interrupt-flags register 542.

The module configuration register 530 allows dynamic selection of the interrupt request number and allows various subsections of the module to be enabled or disabled for low power applications. If the GPS receiver is not currently needed, it can be powered off and the serial UART circuit disabled. If the pulse outputs are not needed, the pulse output driver can be disabled with high-impedance outputs. System 500 can be effectively shutdown to a very low power state by turning off the clock oscillator when system 500 functionality is not required. For diagnostics, the serial UART can be put in loop-back mode and the free-running scaler 522, the capture-input FIFO 524 and pulse-output FIFO 530 may be cleared individually.

System 500 uses 16 bytes of I/O space on the PC/104 (ISA signal compatible) bus. The system 500 I/O space address is jumper selectable from 0x0000 through 0x03F0 in 16 byte steps. Also jumper selectable is the GPS antenna preamplifier voltage to either 3.0V or 5.0V, 50Ω termination to ground on each of the eight capture inputs 512 and 50Ω series termination on each of the eight pulse outputs 514.

The circuit card embodiment of system 500 conforms to the 16-bit PC/104 bus version 2.4 mechanical and electrical specification. The disclosed embodiment of system 500 logic is primarily implemented in a Xilinx Spartan2 Field Programmable Gate Array (FPGA). The FPGA and its configuration ROM can be in-circuit programmed through a JTAG standard interface connector. The JTAG port also allows in-circuit probing of all the FPGA I/O pins for debugging purposes.

Figure 6A:
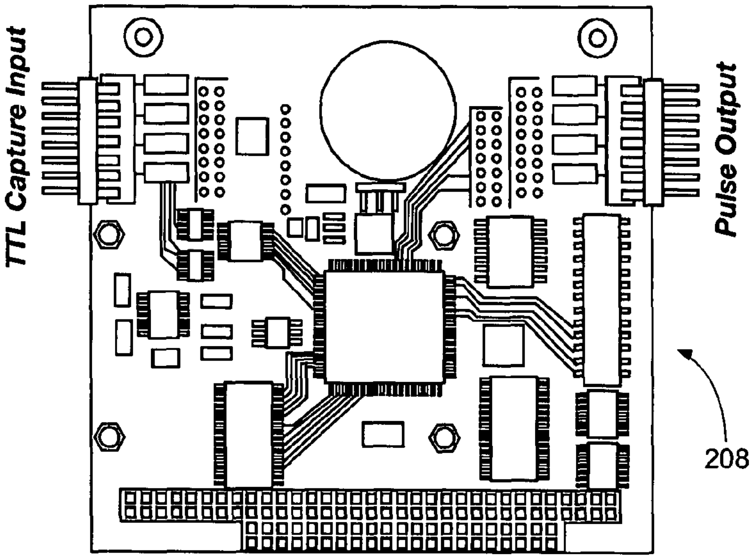
FIG. 6A is a graphic image of a circuit card embodiment of an absolute timing generator and capture circuit according to the present invention.
Figure 6B:
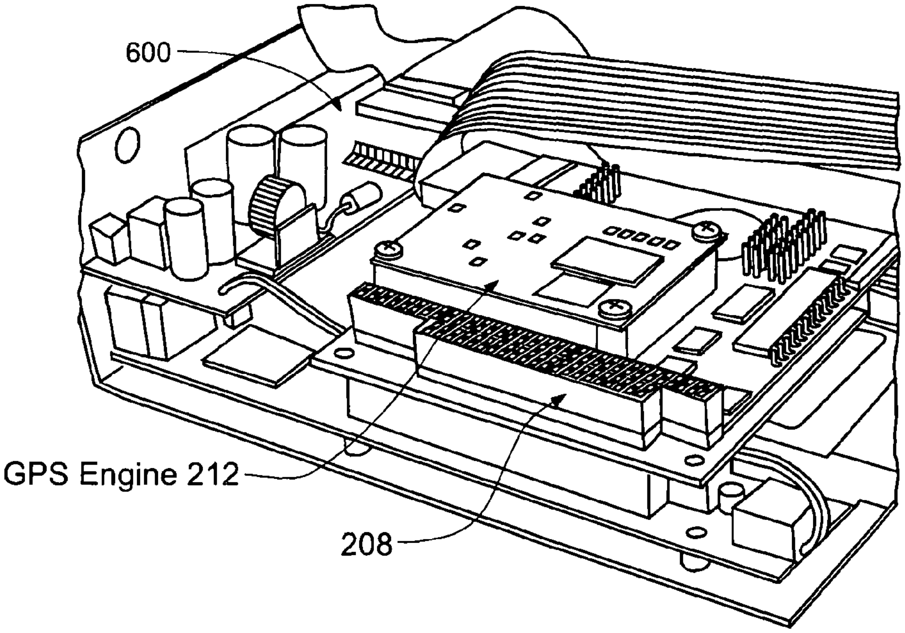
FIG. 6B is a graphic image of the absolute timing generator and capture circuit shown in FIG. 6A with a GPS engine and a host bus interface, according to the present invention.

FIG. 6A is a graphic image of a circuit card embodiment of an absolute timing generator and capture circuit 208. FIG. 6B is a graphic image of the absolute timing generator and capture circuit 208 shown in FIG. 6A with a GPS engine 212 and a host bus interface (shown generally at 600 in white).

Embodiments of the present invention may be used in triggering external light sources, particularly flash-lamp pumped lasers at specific times for calibration of cosmic-ray observatories. Embodiments of the present invention may be used to synchronize the firing times of lasers, see, e.g., F. A. Aqueros et al., Proc 29th ICRC, 8, 335 (2005) and M. Chikawa et al., Proc 29th ICRC, 8, 137 (2005), used to calibrate large-aperture cosmic ray detectors, see J. Boyer et al., NIMA 482 (2002) 457 (2002) and The Pierre Auger Collaboration, NIMA, 532, 50 (2004). These large-aperture cosmic ray detectors record the passage of extensive air-showers in the atmosphere, see R. Abbasi, et al., *Astropart. Phys. J.,* 25, 74 (2006). The same large-aperture cosmic ray detectors can also record tracks produced by light scattered out of pulsed laser beams fired into the sky. Physical separations between the lasers and the detectors can exceed 30 km. A flash-lamp pumped yttrium aluminum garnet (YAG) laser is the typical laser used for such applications. It requires two precisely timed digital trigger pulses to produce light at a specific time. The first pulse triggers the flash lamp. The second pulse triggers a high-speed optical switch (Q-Switch) on the laser causing light emission. For this application, embodiments of the present invention may be configured to generate laser light pulses at specific times so that the resulting laser tracks could be distinguished from cosmic-ray candidate tracks without ambiguity.

Figure 7:
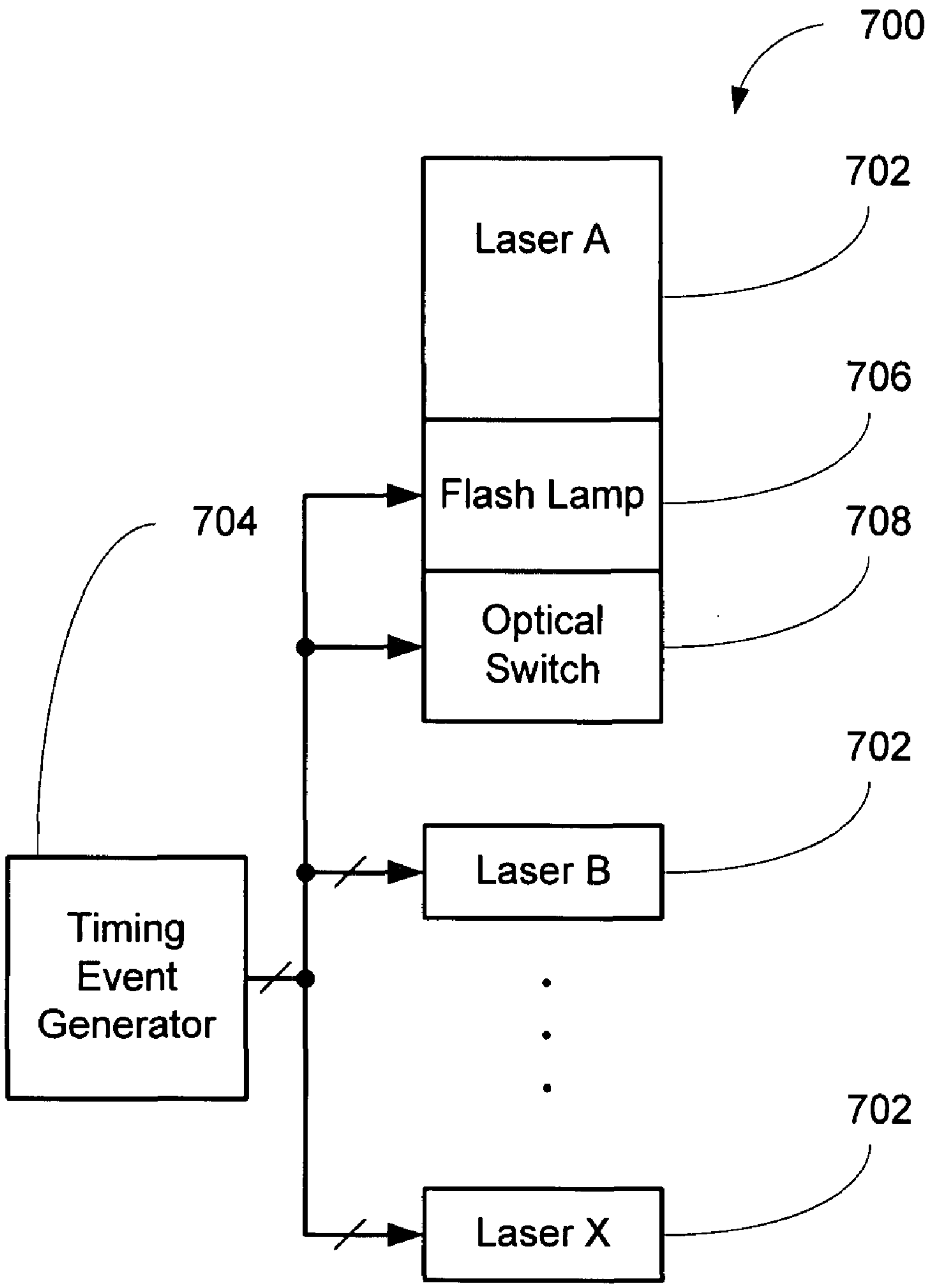
FIG. 7 illustrates an embodiment of a system for calibrating cosmic ray detectors, according to one application of the present invention.

FIG. 7 illustrates an embodiment of a system 700 for calibrating cosmic ray detectors. System 700 may include a plurality of lasers 702. System 700 may further include a timing event generator 704 in communication with the plurality of lasers 702. According to one embodiment of system 700, the timing event generator 704 may be configured for generating a plurality of precisely timed digital trigger pulses to fire the plurality of lasers 702. According to another embodiment of system 700, the plurality of lasers 702 may include one or more yttrium aluminum garnet (YAG) lasers. According to yet another embodiment of system 700, one of the plurality of precisely timed digital trigger pulses may include a pulse configured for triggering a flash lamp 706 in a laser 702. According to still another embodiment of system 700, one of the plurality of precisely timed digital trigger pulses may include a pulse configured for triggering a high-speed optical switch 708 on one of the plurality of lasers to cause light emission. According to still another embodiment of system 700, the high-speed optical switch 708 may be a Q-switch. It will be understood that YAG lasers 702, flash lamps 706, high-speed optical switches 708 and Q-switches are all well known to those of ordinary skill in the art.

Those of ordinary skill in the art will readily recognize that the potential applications for the embodiments of the present invention are considerably broader than the timing of laser firings described above. For example, any application that requires a general purpose timing device for control of timing signals synchronized to global clock signals over significant distances without hardwiring may benefit from the present invention.

Figure 8:
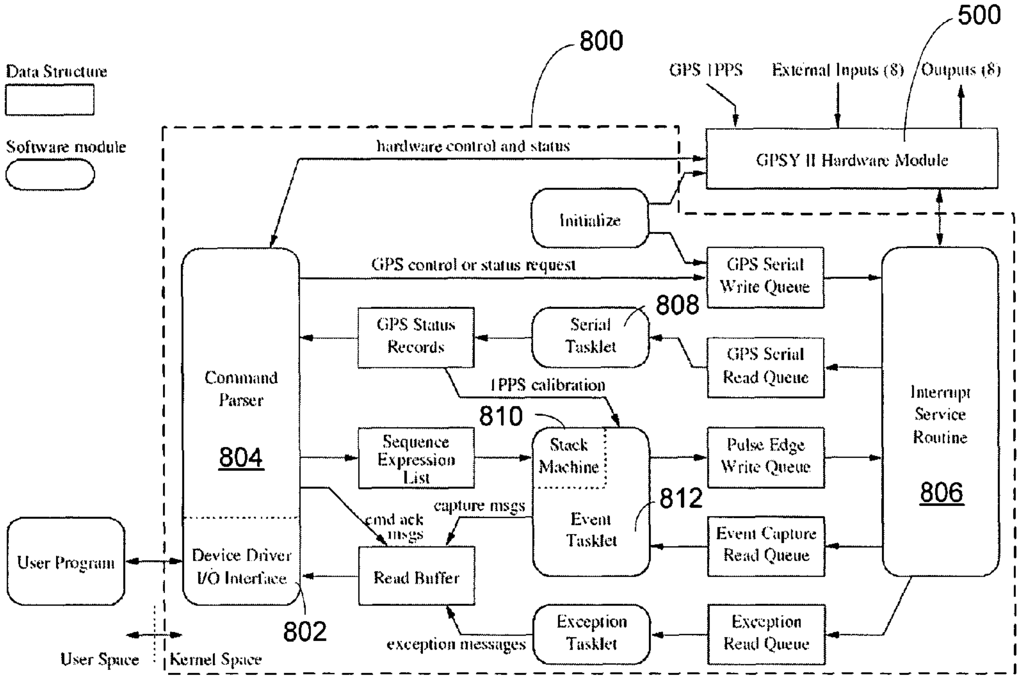
FIG. 8 is a block diagram of the architecture for an embodiment of a device driver suitable for driving the system of FIG. 5, according to the present invention.

A detailed description of a software embodiment of the present invention is disclosed. The software embodiment of the present invention has been implemented in a Linux software device driver interface featuring an extensive set of user commands. A block diagram of an embodiment of a device driver 800 is shown in FIG. 8. The device driver 800 of the present invention supports a command set of more than thirty user functions, see Table 1, below.

TABLE 1

User Interface Commands

| Command Name & Parameters | Description of Command |
|---|---|
| ListCommands\|Help\|? | List of all device driver 800 commands. |
| Capture <chnl> [rising\|falling\|any\|disable] | Enable Input channel edge capture reports. By default all TTL capture inputs are set to capture the rising edge of a signal. This command, with no argument, lists all of the current capture statuses of all of the TTL inputs. Providing a channel number, and an argument, will configure capture of the rising, the falling, or both edges. |
| CaptureGPS [rising\|falling\|any\|disable] | Enable GPS 1 pps edge capture reports. This configures the GPS 1 pps clock to capture either the rising, the falling, or both edges of the signal. |

TABLE 1-continued

<table>
<tr><th colspan="2">User Interface Commands</th></tr>
<tr><th>Command Name & Parameters</th><th>Description of Command</th></tr>
<tr><td>ClockReference [gps|scaler]</td><td>Show/set 1 pps reference source. Under the “gps” option, timing information comes from the GPS. Under the “scaler” option, the system clock is used for timing. When the GPS transitions from survey mode to position hold mode, the clock reference switches automatically from scaler to GPS. In survey mode, the time reference can be forced to GPS, although this is considered unreliable.</td></tr>
<tr><td>CaptureSoft <#></td><td>Generate a soft capture report. This produces a software generated capture event which causes the system 500 to generate an interrupt. This feature provides absolute time profiling for a real-time software program.</td></tr>
<tr><td>ClockFrequency</td><td>Show calibrated scaler clock frequency. This displays the calibrated 40 Mhz clock frequency, relative to the GPS 1PPS signal. The value should be close to 40 million.</td></tr>
<tr><td>ClockSigma</td><td>Show calibrated scaler clock error sigma. This command displays the calculated sigma squared of the collected differences between 40 MHz clock scaler values when the 1 pps GPS interrupt is received.</td></tr>
<tr><td>GPS <hexified message></td><td>Write message to GPS. This converts a hex ASCII message and forwards it to the M12+ receiver. Checksum is automatically calculated.</td></tr>
<tr><td>GPSLocation</td><td>Show current GPS latitude/longitude/altitude.</td></tr>
<tr><td>GPSDate|Date</td><td>Show current Date according to the GPS.</td></tr>
<tr><td>GPSTime</td><td>Show current GPS date and time.</td></tr>
<tr><td>Time</td><td>Displays the formatted GPS time as hours:minutes:seconds.</td></tr>
<tr><td>Altitude</td><td>Show current height in cm according to the GPS.</td></tr>
<tr><td>GPSSatellites</td><td>List the number of tracked and the number of visible GPS satellites.</td></tr>
<tr><td>GPSMode [survey|hold|navigate]</td><td>Show/set GPS operation mode. This command configures the operation mode via the GPS serial command “Gd”. “Survey” mode averages 10,000 valid 2D and 3D position fixes over 2-2.5 hours. Once completed, the GPS transitions to “position hold” mode and the T-RAIM algorithm should now be capable of detecting anomalous satellite readings, isolating them, and removing them. “Navigate” mode represents the normal 3D positioning mode of the M12+ GPS receiver.</td></tr>
<tr><td>GPSLog [enable|disable]</td><td>Show/set GPS messages logged to host. Enable forwards the GPS serial messages to the character device as they are received from the M12+ GPS.</td></tr>
<tr><td>GPSInit</td><td>Initialize GPS. This writes out various initialization commands to the GPS, to configure it to provide the 1 pps time RAIM status message, and the position/data/status message.</td></tr>
<tr><td>Output <chnl> [enable|disable]</td><td>Enable Output channel events. By default all output channel events are enabled. A user can manually disable them with this command. The command with no argument lists the enable/disable channel of all outputs.</td></tr>
<tr><td>OutputPolarity <chnl> [positive|negative]</td><td>Show/set output channel polarity. This sets the polarity of an output signal from either low to high (positive), or high to low (negative).</td></tr>
<tr><td>Sequence <expression></td><td>Add pulse sequence expression to queue. This adds a new pulse sequence expression, following either the an algebraic expression form, or raw stack code. If a semicolon is present in the expression, it will be interpreted as an algebraic expression, otherwise it will be interpreted as stack machine code. Providing no arguments lists all the active sequences.</td></tr>
<tr><td>SequenceRemove <id></td><td>Removes pulse sequence expression from queue. The “id” is an integer to uniquely identify a sequence. The “id” can be obtained with the sequence command.</td></tr>
<tr><td>FlashChannel [<value>]</td><td>Configures a channel to be used for laser flash-lamp triggering. This channel will generate a pulse TriggerDelay microseconds before trigger output pulse. This combination is used to trigger YAG type lasers that require a lamp trigger before a Q-Switch trigger. By default this is set to channel 1, range [1-8].</td></tr>
<tr><td>FlashCount [continuous|<value>]</td><td>Sets the number of flashes before producing a trigger, range [≧0].</td></tr>
<tr><td>FlashPeriod[<value>]</td><td>Sets the period of the flash output in milliseconds, range [0-999].</td></tr>
<tr><td>FlashWidth [<value>]</td><td>Sets the width of the flash output microseconds, range [0-999].</td></tr>
<tr><td>Trigger [stop|flash|fire]</td><td>“Fire” system 500 to start triggering the channel designated by the TriggerChannel command. “Flash” does the same on the channel set by the FlashChannel command. “Stop” terminates pulse generation on both channels.</td></tr>
<tr><td>TriggerChannel [<value>]</td><td>Configures the trigger channel to output on one of the 8 TTL outputs. By default, this is set to channel 2, range [1-8]</td></tr>
<tr><td>TriggerCount [continuous|<value>]</td><td>Sets the number of triggers in the set, range [1-999]. “Continuous” means: trigger until stopped by some other command.</td></tr>
<tr><td>TriggerDelay [<value>]</td><td>This sets the delay in microseconds between the flash and the trigger, range [0-999].</td></tr>
<tr><td>(TriggerOffset)/ (SecondOffset) [<value>]</td><td>Sets the second offset in microseconds of the first trigger in the set, range [−999 to 999].</td></tr>
<tr><td>TriggerPeriod [<value>]</td><td>Sets the trigger period (in number of flashes) while firing, range [1-999].</td></tr>
<tr><td>TriggerWidth [<value>]</td><td>Sets the trigger pulse width in microseconds, range [0-999].</td></tr>
<tr><td>Version</td><td>Current version of system 500 hardware and device driver 800 software.</td></tr>
</table>

The command set shown in Table 1, above, allows considerable flexibility in configuration and operation of circuit card embodiment of system 500 (FIG. 5) of the present invention. For example, the eight input and eight output channels can be programmed independently to generate or capture rising or falling pulse edges. Furthermore, the “CaptureSoft” function of the device driver can capture the times of software generated events, thereby providing absolute time-profiling for real-time software applications.

The device driver 800 of the present invention also supports a stack machine language, see Table 2, below.

TABLE 2

| Stack Machine Language |
|---|
| The system 500 stack machine language uses single-letter readable and writable variables: The syntax is defined as follows:<br>Digits: 0-9 Digits [<digit>]<br>Ops: +, −, *, /, =<br>Logical: %, >, <, =, &, \|, ., !, −, > ...[m][n] − > [m] op [n] |

TABLE 2-continued

| Stack Machine Language |
|---|
| Conditions: ? (conditional) ...[n] –> ...[n][n] : (else) ...–>... . (end-cond) ... –> ... Special: @(dup), d(drop), m(milli), n(negate), r(random), u(micro), v(over), w(swap) |
| Read-Only variables: |
| D day-of-month |
| E day-of-year |
| H hour-of-day |
| M minute-of-hour |
| N month-of-year |
| Q sequence-count |
| S second-of-minute |
| T second-of-day |
| U of epoch |
| Read and Write variables: |
| C count - Number of pulses in a sequence |
| F offset - Offset in nanoseconds into second of first pulse in sequence |
| P Period |
| W Width |
| R Repeat |
| X channel |
| Some Example Expressions: |
| Generate 100 pulses on channel 3 at 10Hz at top of each minute for 10 minutes: sequence 100C 100mP Q10 < R 3X S! |
| Generate 20 'FIRE' pulses at 4Hz, 100μs width, at minutes 12, 24, 36, 48, offset 333ms on ch1: sequence 20C 250mP 100uW 333uF 1R 1X S!M@12%!&& |
| Generate a number of pulses corresponding to the month on a random channel each second: sequence NC 1R 8r1 + X 1 |

Referring to FIG. 8, the following is a description of an embodiment of a software driver 800 configured for controlling the circuit card embodiment of system 500 (FIG. 5). The software device driver 800 for the circuit card embodiment of system 500 performs real-time absolute GPS time calibration of captured input events and generated output pulse sequences. The names and classes of input timing events supported in the driver 800 are listed in Table 3, below.

TABLE 3

Types of capture events configured for time-stamping.

| Name | Class | Source | Description |
|---|---|---|---|
| IPPS | Reference | GPS Receiver | 1 pulse per second (pps) |
| Internal Clock | Reference | 40 MHz scaler | Pulse every 40 million counts |
| TTL in | External | Input Channels (8) | Rising/falling/both edge(s) of TTL pulse |
| SoftCapt | External | Soft Capture Register (5-bit) | Application program writes to register |

The device driver 800 also provides an ASCII text character-device interface (see Tables 1 and 2, above) for application software. The device driver 800 interface accepts human-readable ASCII commands on its character-device input and responds to commands, capture events and hardware exceptions with human-readable messages to its character-device output. Standard Portable Operating System Interface for Unix (POSIX) file I/O functions are employed in this particular embodiment. The device driver 800 can be loaded dynamically into a running Linux operating system kernel.

The Event Tasklet (FIG. 3) of the device driver tracks GPS one-pulse-per-second (1 pps) time reference capture events and the offset errors for these events reported by GPS receiver serial data stream status messages to compute the precise interval between the 1 pps time reference events. The difference in the scaler values captured between time-adjacent pairs of these reference events divided by the computed interval give a precise calibrated frequency for the scaler clock on a second-by-second basis. The absolute date (year, month, day) and time (hours, minutes, seconds) of each 1 pps reference event is tracked for later pulse sequence expression evaluation and capture event output text messages.

For the external capture events, (see Table 1, above) the absolute time of the capture is computed with nanosecond resolution. The time interval and the number of scaler clocks are known between the two nearest GPS 1 pps reference events. The number of scaler counts of an external capture event relative to the previous 1 pps reference event is divided by the calibrated frequency to yield the absolute time of the external capture event.

For output pulse generation, a list of ASCII byte-code sequence expressions is evaluated each second by a stack machine interpreter. The stack machine interpreter must receive sequence expressions at least two seconds before the output pulses are to be generated. The stack machine interpreter can perform basic arithmetic and logical calculations with a predefined set of variables. The sequence expression defines the pulse sequence attributes (pulse width, period, count and offset from start of second or first pulse) and a sequence start trigger based on the current date and time. If evaluation of the sequence start trigger is true, a time sorted list of pulse rising and falling-edge events with the absolute nanosecond precision times is computed from the pulse sequence attributes. Overlapping pulses in any output channel are combined with a simple "OR" algorithm. After all of the sequence expressions have been evaluated and the list of edge events is complete, the pulse edge times for the next second period are then converted to scaler values by extrapolating from the most recent GPS 1 pps time reference event and the calibrated scaler frequency, and fed to system 500 output pulse FIFO 532. Edge events after the next second period are retained and accumulated into the pulse edge event list for the next second.

The Serial Tasklet extracts GPS status messages from the GPS receiver serial stream. GPS status messages are in a Motorola™ binary protocol serial stream. Extracted messages are written into GPS status record data structures. The Event Tasklet reads these data structures to calibrate reference events. The command parser also reads these data structures in response to GPS status queries from the user program.

Exception conditions are monitored by the Exception Tasklet and converted to human readable messages. The software device driver handles some exception conditions. For example, if GPS 1 pps events are missing, a 1 pps watchdog exception will be generated. If this happens too often, the Exception Tasklet will enable the internally generated (40 million scaler count) 1 pps signal for the reference event. If this condition occurs, an error message is sent to the user program.

Upon initialization, system 500 uses the internal clock 508. For precision timing, the user must request that the system 500 enter survey mode. If the current position has already been stored in the internal memory of the GPS receiver, or if the GPS receiver has calculated its position (completed survey mode and switched to position hold mode), system 500 will use the 1 pps as the reference clock. A message is sent to the user program when this condition is satisfied.

Commands that can be sent to the driver module include GPS control and status commands, system 500 hardware control commands and pulse sequence expression and attribute commands. The device driver module responds to all commands with a message indicating the current control value or status.

A set of commands also provides a simplified interface for generating pulses to trigger flash-lamp type lasers. These commands define two output pulse sequences. Pulses from the first sequence trigger the laser flash-lamp at a specific time offset before pulses from the second sequence trigger the laser Q-Switch.

The software implementation of device driver 800 is described in Table 4, below.

TABLE 4

Implementation of Device Driver 800

| File Name | Description |
|---|---|
| fileop.c | Defines device driver file operation routines for individual device nodes including: read, write, poll, ioctl (I/O Control), open, and release. Implements the basic control center for the entire device driver 800. Simple ASCII user commands are translated into machine level commands that operate the system 500 hardware. This module implements the requirements of the Device Driver I/O Interface 802, and the Command Parser 804 shown in FIG. 8. |
| gps.c | Routines for initialization, configuration, and processing GPS engine I/O. |
| init.c | Routines for hardware initialization and shutdown. |
| intr.c | Module for handling interrupts. The module receives interrupts generated by system 500. As system 500 accumulates an internal queue of capture events, GPS serial output, and message events, this module copies that data to a set of internal queues. It then triggers background tasklets to process this data. This module implements the Interrupt Service Routine 806 (FIG. 8). |
| mesg.c | Tasklet to handle exception messages. This tasklet executes when errors, or various conditions occur. For example, this tasklet will emit a message when the GPS switches to position hold mode, see Table 1. |
| pcap.c | Tasklet to handle pulse capture events, software capture events, and clock frequency calibration. This tasklet processes the 1 PPS GPS clock input (from GPS engine 510, FIG. 5) and captured pulses on the 8 TTL inputs 512 (FIG. 5). This tasklet keeps timing statistics of the 40 MHz clock 508 (FIG. 5) to produce absolute time stamps for capture inputs, and precise 40 MHz scalers. |
| pulexpn.c | Parse sequence expression and build pulse output event sequences. This module interprets the given expression once per second, to determine if the expression is applicable to the next second. |
| queueops.c | Utility routines for event queues. |
| rxtasklet.c | Tasklet to extract GPS messages and store them in global records. The GPS engine 510 is instructed to dump the current status of internal registers at a 1 pps interval. These structures are used throughout the rest of the device driver 800 for timing calibration, and reporting the GPS status to the user. This module implements the requirements of the Serial Tasklet 808 (FIG. 8). |
| stckm.c | Sequence expression stack machine. This module is used by the pulexpn.c module above to parse the sequence expressions. The last value left on the stack is used to determine if this particular sequence will be used in the next second. This module implements the Stack Machine 810 of the Event Tasklet 812 (both in FIG. 8). |
| tmops.c | Time utility functions. |

It will be understood that the present invention may be embodied in other specific forms without departing from its spirit or essential characteristics disclosed herein. The described embodiments are to be considered in all respects only as illustrative and not restrictive. Various other configurations may be understood by those skilled in the art based upon the material disclosed herein. The scope of the invention is therefore indicated by the appended claims rather than by the foregoing description. All changes which come within the meaning and range of equivalency of the claims are to be embraced within their scope as well.

What is claimed is:

1. A system for precise absolute time event generation and capture, comprising:

a timing event generator for generating output timing events, wherein the output timing events may be a rising edge, a falling edge or any combination of a rising or falling edge, wherein the timing event generator is configured to independently generate the output timing events on a plurality of output channels;

a timing event receiver for sensing input timing events, wherein the input timing events may be a rising edge, a falling edge or any combination of a rising edge or falling edge;

a universal clock receiver for obtaining an absolute time clock signal; and a processor in communication with the timing event generator, the timing event receiver and the universal clock receiver, capturing times of software generated events or interrupts, thereby providing absolute time-profiling of realtime software applications.

2. The system according to claim 1, wherein the timing event generator comprises pulse edge logic configured for generating the output timing events synchronized to the absolute time clock signal.

3. The system according to claim 1, wherein the timing event receiver comprises capture edge logic for receiving timing events synchronized to the absolute time clock.

4. The system according to claim 1, wherein the timing event generator is configured for generating the output timing events on eight output channels.

5. The system according to claim 1, wherein the timing event receiver is configured to independently receive input timing events on a plurality of input channels.

6. The system according to claim 5, wherein the timing event receiver is configured for receiving the input timing events on eight input channels.

7. The system according to claim 1, wherein timing event generation and capture comprises a timing measurement error of about 25 ns or less.

8. The system according to claim 1, wherein timing event generation and capture comprises a timing measurement error of about 12.5 ns or less.

9. The system according to claim 1, wherein the universal clock receiver is configured to provide a global positioning system (GPS) timing signal.

10. The system according to claim 1, wherein the universal clock receiver comprises a global positioning system (GPS) engine.

* * * * *